United States Patent
Chun (10) Patent No.: US 10,096,234 B1
(45) Date of Patent: Oct. 9, 2018

(54) SMART BAND FOR AUTONUMOUSLY RECOGNIZING CRISIS SITUATION AND AUTOMATICALLY REQUESTING RESCUE ON THE BASIS OF SOUND AND MOTION PATTERNS

(71) Applicant: Kue Sang Chun, Busan (KR)

(72) Inventor: Kue Sang Chun, Busan (KR)

( * ) Notice: Subject to any disclaimer, the term of this patent is extended or adjusted under 35 U.S.C. 154(b) by 0 days.

(21) Appl. No.: 15/716,875

(22) Filed: Sep. 27, 2017

(51) Int. Cl.

| | | |
|---|---|---|
| *G10L 25/51* | (2013.01) | |
| *G06Q 10/08* | (2012.01) | |
| *H04W 4/02* | (2018.01) | |
| *G08B 25/01* | (2006.01) | |
| *G08B 21/04* | (2006.01) | |
| *G08B 21/02* | (2006.01) | |
| *G10L 15/06* | (2013.01) | |

(52) U.S. Cl.
CPC ....... *G08B 25/016* (2013.01); *G08B 21/0269* (2013.01); *G08B 21/0277* (2013.01); *G08B 21/0283* (2013.01); *G08B 21/0446* (2013.01); *G08B 21/0492* (2013.01); *G10L 15/063* (2013.01); *G10L 25/51* (2013.01)

(58) Field of Classification Search
CPC .................................................. G08B 25/016
See application file for complete search history.

(56) References Cited

U.S. PATENT DOCUMENTS

| | | | | |
|---|---|---|---|---|
| 7,733,224 | B2 * | 6/2010 | Tran ..................... | G06F 19/3418 340/540 |
| 8,323,189 | B2 * | 12/2012 | Tran ..................... | A61B 5/0024 600/300 |
| 9,514,633 | B2 * | 12/2016 | McNutt .................. | G08B 25/12 |
| 2016/0140834 | A1 * | 5/2016 | Tran ..................... | G06F 19/3418 340/539.11 |

* cited by examiner

*Primary Examiner* — Joseph Feild
*Assistant Examiner* — Pameshanand Mahase
(74) *Attorney, Agent, or Firm* — Egbert Law Offices, PLLC (57) ABSTRACT

Disclosed is a wearable device for sensing a crisis situation and requesting rescue. The smart band has: a microphone for collecting sound patterns emitted in a crisis situation; a sound/speech signal pattern library for storing keyword sound patterns generated in each crisis situation; sensors installed to sense abrupt movement of a wearer; a motion analysis memory for storing a waveform determination algorithm for collecting signals inputted from the sensors, analyzing a motion signal pattern, and categorizing the motion signal pattern as impulse, pulsation or steady; a crisis situation recognition processor for deriving a crisis situation code; a microcontroller for automatically transmitting a request for rescue, together with the crisis situation code, GPS position and personal information of the wearer; a Bluetooth communication interface unit; a smart phone monitoring circuit; and a switch for recording sexual harassment speeches or manually initiating a crisis situation when the wearer is sexually harassed.

6 Claims, 7 Drawing Sheets

SMART BAND FOR AUTONUMOUSLY RECOGNIZING CRISIS SITUATION AND AUTOMATICALLY REQUESTING RESCUE ON THE BASIS OF SOUND AND MOTION PATTERNS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a wearable device for sensing a crisis situation and requesting rescue, and more specifically, to a personal safety security device for sensing a voice, a strange sound or the like generated when a crisis is encountered, collecting and analyzing subsequently generated motion patterns of the movement of the wearer, deriving a crisis situation code of any one of terror, sexual violence, a falling accident of an old person, ground sinking, sexual harassment and the like, and automatically transmitting a request for rescue to a rescue team and a guardian, together with position information.

2. Description of Related Art Including Information Disclosed Under 37 CFR 1.97 and 37 CFR 1.98

Terror, firearm accidents and crimes of sexual harassment and sexual violence occurred by those in lack of morals and ethics increase every year. In addition, when an old person falls down unconscious and does not wake up in a desolate place or at home living alone, cases of encountering some misfortune also increase if the old person is not rescued and left unattended.

When a person is trapped underground due to abrupt ground sinking caused by a natural disaster such as tsunami, earthquake or the like, the cases of losing life also increase since the person cannot operate a smart phone by himself or herself because of an injury or the like. In addition, the cases of a drunken person falling down on the road and meeting with a terrible accident also occur occasionally. Accordingly, various measures for personal safety have been announced recently.

In the case of a personal safety device of the prior art, a user should take out a safety phone and press an emergency button when the user encounters a crisis. However, this is a very dangerous action to do in the face of a criminal and is not much effective since the user does not have time to use the safety phone in most cases. Although devices such as an emergency whistle, a pepper powder sprayer and the like, other than the safety phone, are introduced, they are not so effective in a state of confronting a criminal. In addition, there are many cases in which the user cannot operate the emergency button by himself or herself when the user is injured or unconscious.

However, an integrated wearable personal safety device for sensing a gunshot, a strange sound, a scream, an outcry or the like actually generated at a crisis spot, collecting and analyzing motion patterns of a victim in a crisis situation, recognizing whether this is a crime of sexual violence or sexual harassment targeting a woman, an injury caused by a falling accident or a crisis situation caused by a natural disaster, and automatically requesting rescue by wirelessly transmitting a crisis situation code and position information has not been yet devised.

In addition, a smart phone is used as a means for notifying a guardian of such a crisis situation, and if the user does not possess a smart phone, a request for rescue cannot be made in such a crisis situation. Although a device for alarming to possess a smart phone when the user does not possesses the smart phone is absolutely necessary to prevent a case of unintentionally forgetting to carry a smart phone, prior arts proposing such a device do not exist.

However, although there exists a device which searches for a smart phone when a user lost the smart phone, a smart band for actively monitoring a smart phone to determine whether a user possesses the smart phone and ringing a warning alarm to inform that the smart phone is not in the neighborhood does not exist yet in the prior art. Hereinafter, patents of the prior arts quite similar to the present invention will be analyzed.

"A smart band and emergency state monitoring method using the same" disclosed in Korean Laid-opened Patent No. 10-2015-0136716 (publication date is Dec. 8, 2015) relates to a remote safety phone for children that is sold in the market as a product named as "Kids phone". If a remote watcher sends a message to the smart band of the kids phone, the smart band transmits predetermined information, background sounds, background images and position information to the phone of the remote watcher.

When a crisis situation is encountered, the crisis situation is recognized and notified to the remote watcher only when the wearer of the smart band touches both the display screen of the smart band and a touch switch on the side surface at the same time for a preset time period. In the case of automatically recognizing a crisis situation, if the wearer of the smart band waves hands and runs in a hurry, the wearer is recognized as being chased by someone, and the remote watcher determines occurrence of a crisis situation.

In this patent of the present invention, since a crisis situation is notified only when the wearer presses an emergency touch switch or waves hands when a crisis is encountered, notification of the crisis situation is not transmitted if the wearer does not act like this. In addition, a smart band worn on a child cannot actively monitor the kids phone. Accordingly, when a child does not carry the kids phone, the parents cannot check the child remotely.

As a technique similar to this, "a dangerous situation management system by self-protection ring" disclosed in Korean Patent Registration No. 10-1612507 (registration date is Apr. 7, 2016) has an acceleration sensor, a pulse sensor and a press switch installed in the body of a ring put on a finger of a user and provides a method of generating a notification signal if the press switch of the ring is pressed, transmitting information on the movement of the body of the ring or information on the state of the body of the user to mobile communication terminals of the user and a guardian, and determining, by a dangerous situation determination module of a dangerous situation management application installed in the terminals, whether the user is in a dangerous situation on the basis of any one of an acceleration value for determining an impact, a preset user motion pattern for estimating a dangerous situation and a preset pulse rate for estimating a dangerous situation, which is a method of recognizing a dangerous situation using only the acceleration value and the pulse rate and cannot specifically recognize a dangerous situation, such as terror, sexual violence/violence, a falling accident, being trapped underground due to a natural disaster or the like, by analyzing patterns of keywords, screams and strange sounds generated in sexual harassment or sexual violence or patterns of victim's motion generated in an actual crisis situation.

"A mobile device for detecting dangerous situation using learning information and operation method thereof" disclosed in Korean Laid-opened Patent No. 10-2016-0038960 (publication date is Apr. 8, 2016) is a method of deriving Bayesian statistics by associating sensing information inputted from a gyro sensor, an acceleration sensor, a temperature sensor or the like installed in a mobile communication terminal with information on crisis situations encountered in the past, and recognizing a dangerous situation if these values exceed a threshold, and this is a very ridiculous method since a user should have several experiences (data) of encountering dangerous situations.

Korean Laid-opened Patent No. 10-2015-0074565 presents a method of recognizing shaking or an impact of a wearer as a dangerous situation using an acceleration sensor as a danger detection device worn on a human body and suspending notification of the dangerous situation until a preset condition is satisfied. However, the method recognizes only an impact or shaking of a wearer as a dangerous situation and does not specifically recognize an actual external crisis situation, such as terror, sexual violence, sexual harassment, a falling accident of an old person, a natural disaster or the like.

Other than these, Korean Patent Registration No. 10-1558512 proposing "a danger detection system using a smart insole and a processing method therefor" provides a method of notifying a predetermined guardian of a crisis situation through a smart phone when movement of a user of a smart phone and a smart insole is not sensed by a pressure sensor installed in the smart insole and an acceleration sensor installed in the smart phone due to an abrupt faint or various falling accidents that may occur while the user is doing an outdoor activity, and it does not specifically sense a safety accident occurred by terror, sexual violence, sexual harassment, a natural disaster or the like. In addition, this method cannot request rescue in an actual crisis situation other than a case of losing consciousness of the wearer himself or herself.

In addition, Korean Patent Registration No. 10-1609914 (registration date is Mar. 31, 2016) presents "a method for sensing emergency in response to a physical or mental impact and apparatus for sensing emergency using the method". This patent presents a method of performing a process of deriving a psychological impact data value by converting a signal inputted through an acceleration sensor, i.e., an impact acceleration value measured by processing physical impact data, into a life-type physical impact data value or the like corresponding to a level of impact more than a falling accident, a level of violently pushing in a moment, a level of running fast, a level of walking or being dragged or a level of motion lower than a predetermined value, receiving sounds or voices through a sound sensing module and categorizing a measured decibel dB value as a level of a scream, a cry of a child, or an SOS requesting help, and analyzing whether the sounds or voices match a keyword registered in advance, such as 'Oh my gosh', 'Freeze', 'Follow me', 'Give me the money' or the like, and calculating a composite impact data by analyzing a temporal sequence of generating the data and change of strength of the data and determining a crisis situation if the composite impact value, as well as the physical impact value and the psychological impact value, is larger than a reference value.

The process of calculating the physical, psychological and composite impact values consumes a large amount of time, is worried to delay a request for rescue in a crisis situation, and does not separately recognize a crisis situation caused by terror, sexual violence, a falling accident or a natural disaster.

However, in the present invention, a crisis situation is detected spontaneously since a threshold detector circuit is provided in the signal detection terminals of a microphone and inertia and acceleration sensors, and unlike the patent reviewed above, time-consuming calculation of the physical impact value, the psychological impact value and the composite impact value is not performed. A result of detecting keywords of various crisis situations from the sound data detected by a high-performance microphone, data on a state of a victim grasped from the motion signal waveforms of the victim, and the sound pattern data are examined using "AND" and "OR" logic to categorize a situation as terror, sexual violence/violence, a falling accident, a natural disaster, ground sinking, being trapped underground, sexual harassment or the like in real-time and determine a crisis situation.

That is, the present invention provides a device for sensing and analyzing a voice pattern of a gunshot, a scream, "You shouldn't do this", "Help me" or the like generated in various crisis situations or a sound pattern of a strange sound such as "Bam", "Thud" or the like, acquiring and analyzing a motion pattern of a victim from the inertia sensor and the acceleration sensor for 20 seconds, determining a crisis situation such as sexual harassment, sexual violence, a falling accident of an old person, being trapped underground due to ground sinking or the like, and automatically transmitting a request for rescue to a local rescue team and a guardian by sending a crisis situation code corresponding to the crisis situation, together with position information. Particularly, the present invention senses various attacks to the body of a victim and a degree of resistance to an external force applied to the body using an inertia sensor and measures acceleration of the body applied by the external force and felt by the victim using an acceleration sensor. When a situation occurs abruptly, inertia and acceleration signals are pulsated if the signals exceed a predetermined threshold level and the situation is consistently maintained, and if the victim falls down and is unconscious or injured and thus cannot move the body, the inertia and acceleration signals fluctuate from a big pulse generated once to a level lower than the threshold.

The input signal patterns of the inertia and acceleration sensors like this are acquired for a preset time period, and it is determined whether the inertia and acceleration signal waveforms are simple impulses, whether several pulses cross the threshold level several times, or the whether the inertia and acceleration signal waveforms maintain a predetermined level, i.e., the inertia and acceleration signal waveforms are categorized as Impulse, Pulsation, Steady over threshold or Steady below Threshold, and various crisis situations are promptly determined in real-time by logically processing the waveforms using "AND" and "OR" logic, together with a crisis situation derived from sound data. That is, the present invention determines various crisis situations in a speedy way through fast hardware logic signal processing, not a software method taking a processing time.

In addition, since the crisis situation code and the request for rescue are wirelessly notified through a smart phone of a victim and thus the smart phone should be possessed at all times, an automatic smart phone monitoring function automatically checks whether the user possesses a smart phone in real-time and generates a warning alarm such as vibration or the like if the user does not possess a smart phone so that the user may possess a smart phone without fail.

BRIEF SUMMARY OF THE INVENTION

Therefore, the present invention has been made in view of the above problems, and it is an object of the present invention to provide a smart band for autonomously recognizing a crisis situation and automatically requesting rescue as a wearable device worn on the body of a user in the form of a bracelet or a necklace, which primarily recognizes a crisis situation, such as terror, sexual violence, a falling accident of an old person, being trapped underground due to ground sinking, sexual harassment or the like, from a sound by collecting a voice or a strange sound generated when the crisis situation occurs using a high-performance microphone, and secondarily recognizes a crisis situation from sound and motion patterns by collecting motion patterns of a user using inertia and acceleration sensors. The smart band provides two or more recognition steps so that a false alarm may not be generated and reminds the user to possess a smart phone at all times by monitoring a pairing smart phone.

To accomplish the above object, the present invention applies a smart band of a bracelet form as an example of a wearable device. The smart band comprises: a high-performance microphone for sensing voices such as a scream, "Help me" and the like and strange sounds such as "Thump", "Bang", a gunshot and the like; temporary memory for storing the voices and the sounds; an acceleration sensor for sensing abrupt movement of a wearer; an inertia sensor for measuring physical resistance and a motion state; a speech/sound pattern library for storing patterns of various voices and sounds that may generate in a crisis situation such as terror, sexual harassment, sexual violence, a falling accident, being trapped underground and the like in memory as reference models; a motion pattern library for modeling continuously generated pulse signal patterns of inertia and acceleration sensor signals of various motion patterns that can be generated in various crisis situations and storing the pulse signal patterns in memory, together with an analysis algorithm; a digital converter for converting an analog signal into a digital signal by rectifying and filtering an input signal of the sensors; a crisis situation recognition processor for deriving a crisis situation code of any one of terror, sexual violence, a falling accident of an old person, being trapped underground due to ground sinking, sexual harassment and the like by comparing and analyzing the digital signal data with the models in the library; a Bluetooth communication unit for modulating the crisis situation code and a rescue request message needed for rescue on the Bluetooth carrier and transmitting the rescue request message to the smart phone possessed by the wearer; and a microcontroller for controlling operation of the units.

An app for automatically informing a crisis situation is installed in a pairing smart phone of a user of the device according to the present invention, and a phone number of a guardian to which personal information and a crisis situation of the user is notified by operating the app is stored in advance. A local rescue team is automatically stored. If a crisis situation is sensed from the smart band and a crisis situation code, a crisis situation alarm and a rescue request signal are inputted into a Bluetooth reception unit, the smart phone automatically transmits personal information and position information of the wearer, the crisis situation that the wearer encounters, and a request for rescue relevant the crisis situation to the local rescue team and the guardian through a smart phone mobile communication network.

Meanwhile, the terms and words used above in this specification and the claims should not be limited to commonly-used or dictionary meanings, but should be interpreted as meanings and concepts relevant to the technical spirits of the invention based on the fact that the inventor may properly define the concept of the terms to explain the invention in best ways. Therefore, the embodiments described in the specification and the configurations depicted in the drawings are only most preferable embodiments and do not represent all technical spirits of the invention, so it should be understood that various equivalents and modifications that can substitute for them may exist at the time of filing this application.

DESCRIPTION OF SYMBOLS

10: Smart band module
20: Wrist band
30: Time display
40: Microcontroller
50: Microphone
60: Acceleration sensor
70: Inertia sensor
70: Audio signal pattern library
80: Memory
90: Illuminance sensor
100: Sexual harassment crisis initiation or manual switch
200: Audio signal processing block
300: Acceleration/Inertia sensor signal processing block
130: Smart phone monitoring module 140: Bluetooth interface module
150: Secondary cell recharge module
160: USB connector

DETAILED DESCRIPTION OF THE INVENTION

Hereafter, the embodiments of the present invention will be described in detail with reference to attached FIGS. 1 to 7. Meanwhile, in the figures and the detailed descriptions, figures and descriptions on the configurations and operations that can be easily understood by those skilled in the art are simplified or omitted from h descriptions of a smart band, a personal safety wearable device, a sound sensor, an acceleration sensor, an inertia sensor, Bluetooth communication, smart phone pairing, a smart phone, a mobile communication terminal and the like. Particularly, in the figures and the detailed descriptions, detailed descriptions and figures of the specific technical configurations and operations of an element that is not directly associated with the technical features of the present invention are omitted, and only the technical configurations related to the present invention are shown or described.

Figure 1:
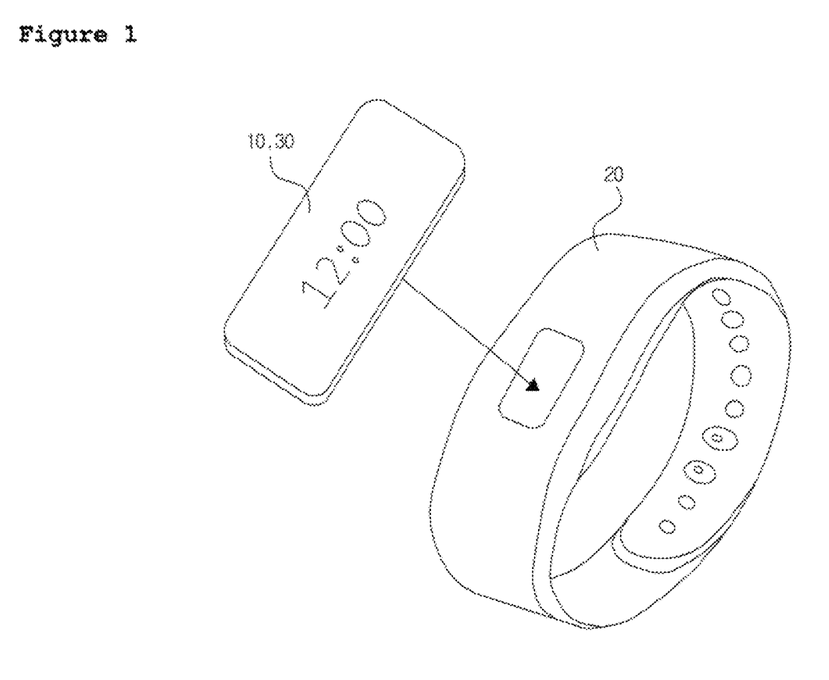
FIG. 1 is a view showing a smart band for autonomously recognizing a crisis situation such as terror, sexual violence/violence, a falling accident, being trapped underground, sexual harassment or the like and automatically requesting rescue according to an embodiment of the present invention.
Figure 2:
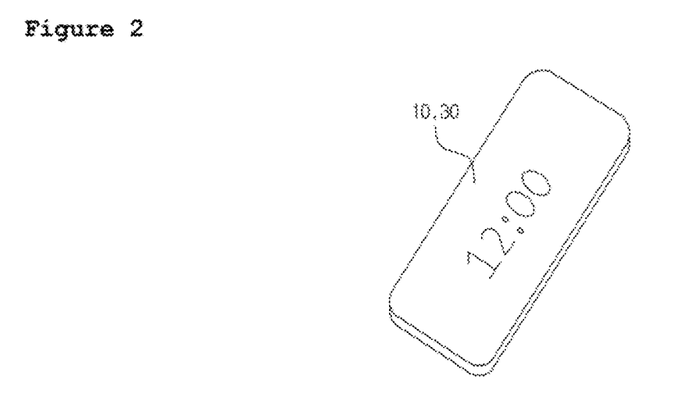
FIG. 2 is a view showing a process module of a smart band according to an embodiment of the present invention.
Figure 3:
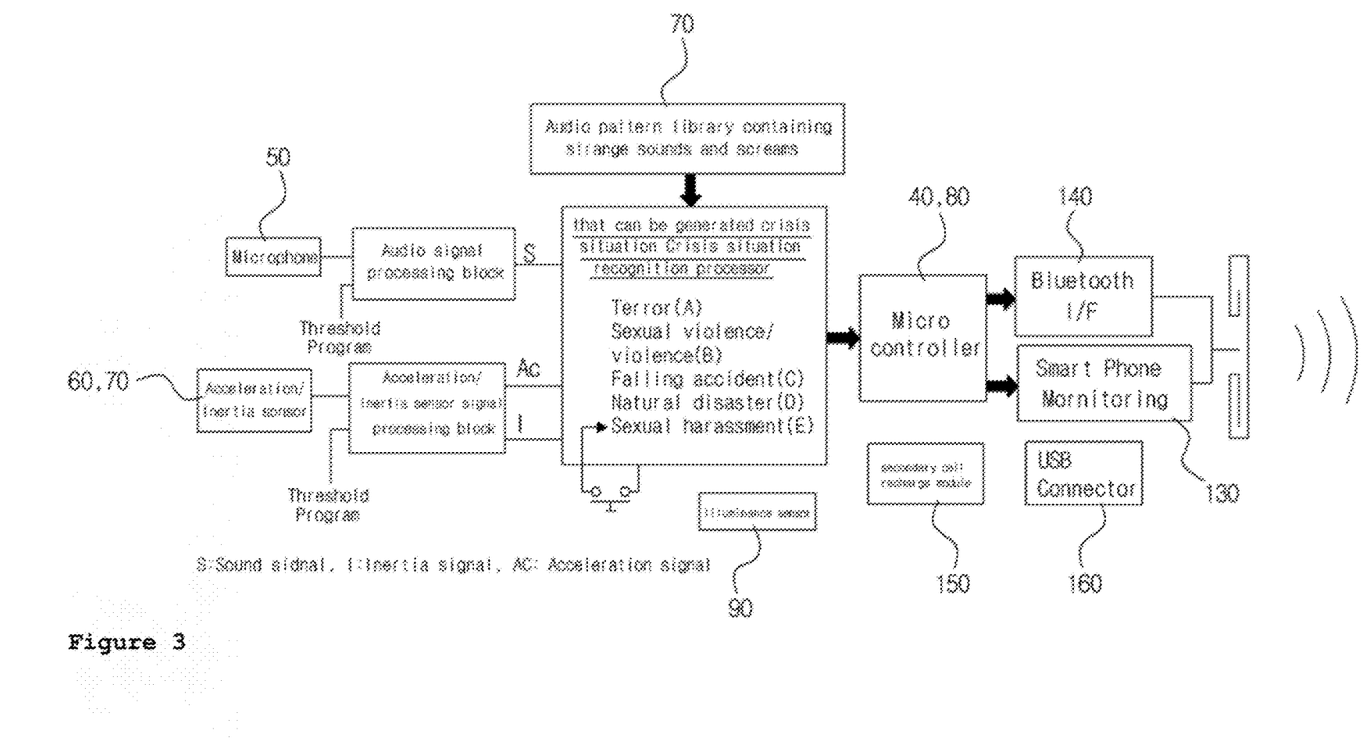
FIG. 3 is a block diagram showing a smart band according to an embodiment of the present invention.
Figure 5:
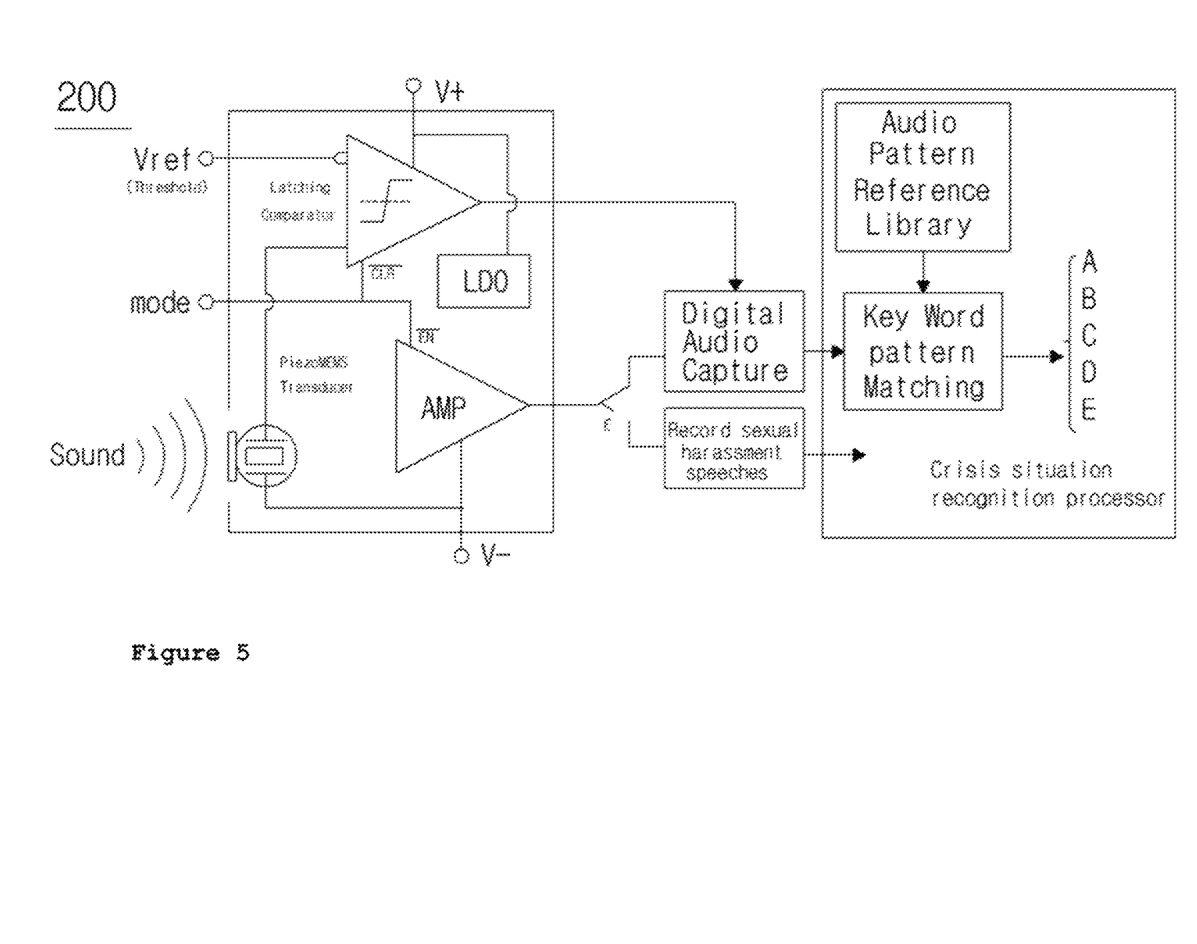
FIG. 5 is a view showing an audio signal processing block.
Figure 6:
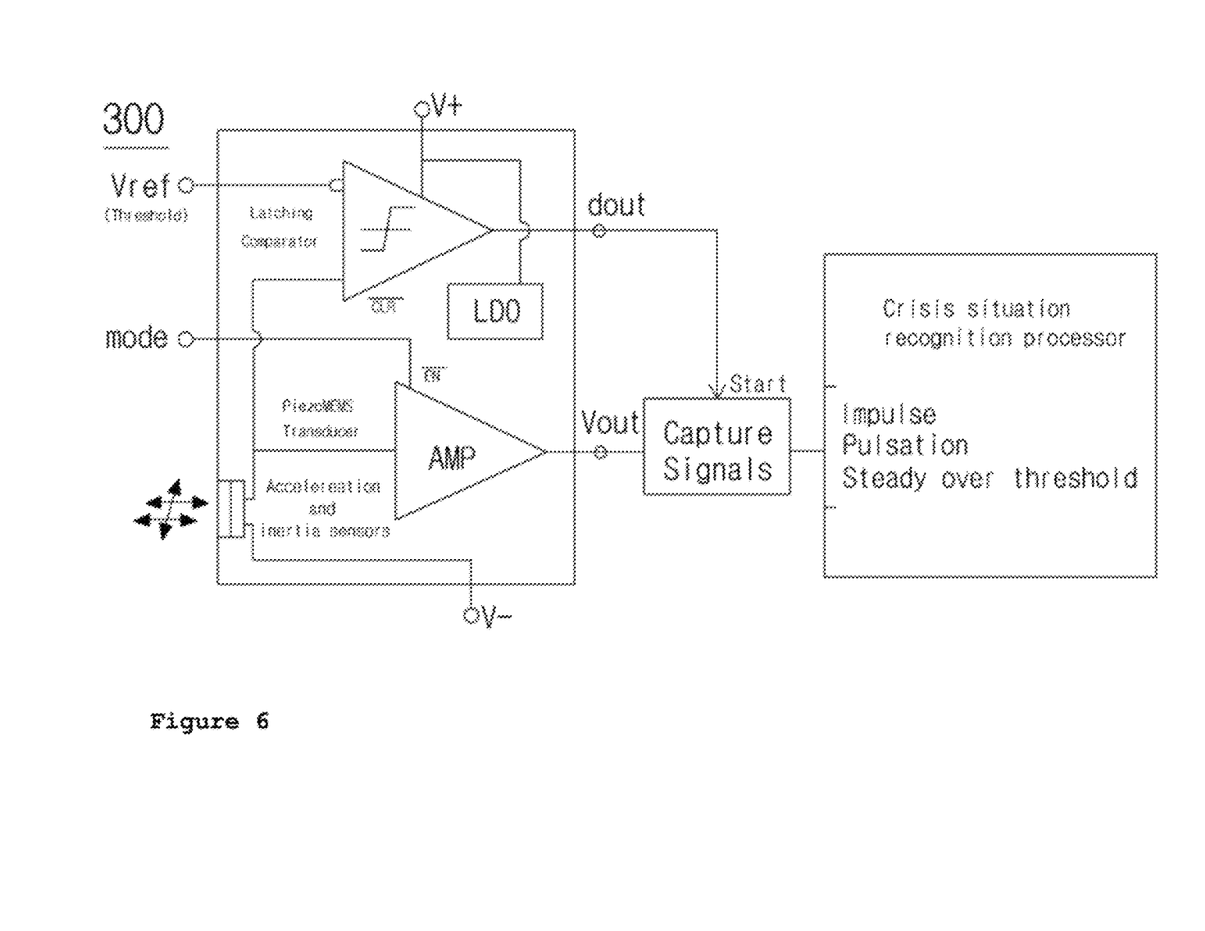
FIG. 6 is a view showing a signal processing block of an acceleration or inertia sensor.

As an example of the present invention, a smart band is a device worn on the wrist of a user like a bracelet. FIG. 2 shows a smart band module 10 assembled in a wrist band 20, and times 30 are displayed in normal times. A microcontroller 40, a microphone 50, an acceleration sensor 60, an inertia sensor 70, an audio (sound/speech) signal pattern library memory 80, an illuminance sensor 90, a sexual harassment crisis initiation or manual switch 100, an audio (sound/speech) signal processing block 200, an acceleration/inertia sensor signal processing block 300, a smart phone monitoring block 130, a Bluetooth interface module 140, a secondary cell recharge module 150, a USB connector 160 and a memory module are installed in the smart band module 10. The crisis situation recognition process shown in FIG. 1 is crisis situation recognition software executed by the microcontroller. The audio signal processing block is shown in FIG. 5, and the acceleration/inertia sensor signal processing block is shown in FIG. 6.

Figure 4:
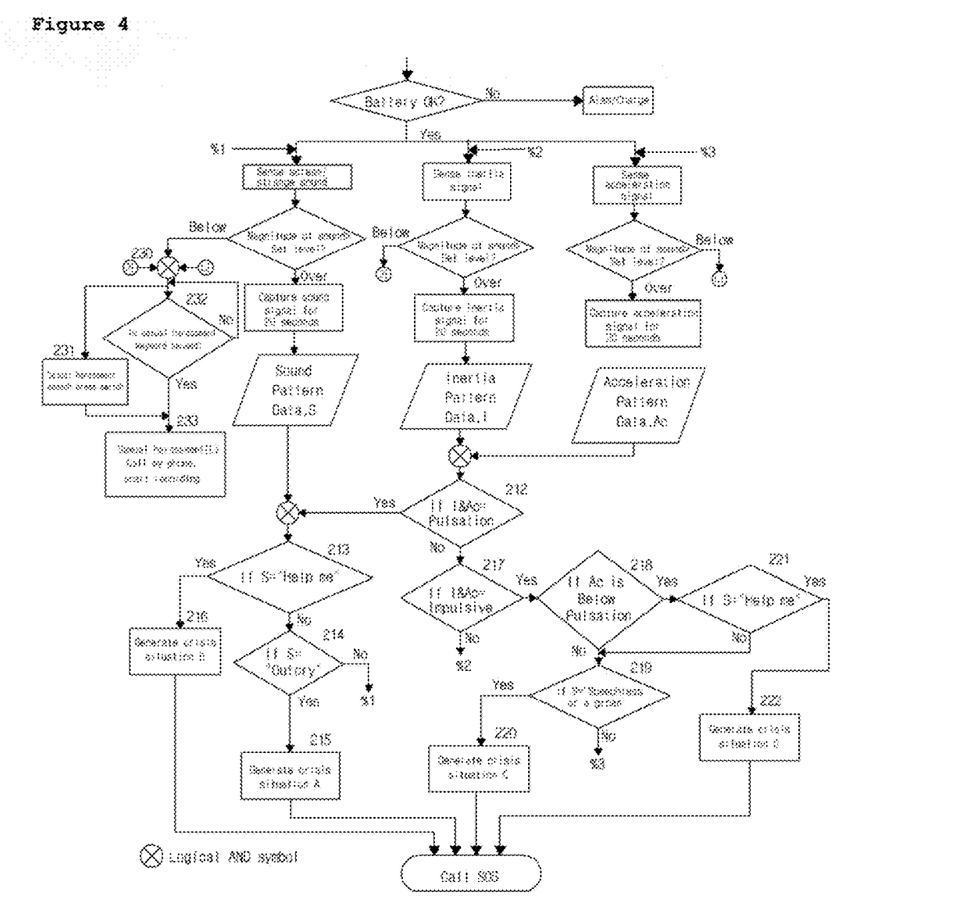
FIG. 4 is a view showing the flow of determining a crisis situation by a smart band according to an embodiment of the present invention.

Occurrence of terror is described as an example of the present invention. In the case of terror, generally, gunshot sounds are heard, and people on the spot are surprised and suddenly begin to move. The gunshot sounds are captured for 20 seconds immediately after the gunshot sounds inputted into the microphone of FIG. 5 hike up crossing a threshold. At the same time, signals of the inertia and acceleration sensors go upward crossing the threshold. The threshold detectors of the audio (sound/speech) signal processing block 200 shown in FIG. 5 and the motion signal processing block shown in FIG. 6 generate start command logic for capturing audio signals and motion signals for 20 seconds. In the pattern of the motion signals captured for 20 seconds, if the signal patterns of the acceleration signal Ac and the inertia signal I determined by the decision process 212 shown in the algorithm of the signal processing flow of FIG. 4 are pulsation and if a keyword detected from the captured audio signal pattern S is not "Help me" 213, but an outcry 214, this is determined as crisis situation A, i.e. terror.

If the keyword detected from the audio signal pattern S captured in the process is "Help me" 213, this is determined as crisis situation B, i.e. sexual violence. In the case of sexual violence, vibrating waves of inertia sensor signals generated by screams and resistance and acceleration sensor signals generated by twist of body are continuously generated. In this case, the voice signal of a scream captured by the microphone and the acceleration sensor signal capturing the twist of body generated by resistance are generated intermittently and continuously. A series of sound patterns and motion patterns are recognized as sexual violence and transmit crisis situation code B to the smart phone. If crisis situation code B is received, the smart phone transmits personal information, a character message informing that the user is suffering from sexual violence and GPS position information to the 112 local rescue team and a guardian previously programmed in the smart phone.

If the signal patterns of the acceleration signal Ac and the inertia signal I captured for 20 seconds are impulsive 217, and the inertia signal of a signal captured again is weak and the acceleration signal pulsates below the threshold 218, it shows that the wearer is continuously moving, and if a keyword detected from the audio signal pattern S captured again is "Help me" 221, it is understood that the wearer is trapped underground and conscious and requests rescue while continuously moving to find a way out. In addition, since the illuminance sensor 90 senses a dark state of a signal, it is understood that the wearer is trapped in a basement or a barn with no light. At this point, although the wearer himself of herself may request rescue by operating the switch 100 installed in the smart band, the smart band has already transmitted crisis situation D 222, i.e., a crisis situation code informing that the wearer is trapped in a basement or a barn.

In the case of ground sinking, one or two big pulses are contained in the signals of the inertia sensor and the acceleration sensor, and after the sinking is completed, these signals are calmed down, and outcries such as "Help me", "Is anybody there" and the like may be generated instead. The outcries are captured by the microphone and matched to the patterns in the sound/speech signal pattern library and show a correlation coefficient of 0.8 or higher. The smart band transmits crisis situation code D to the smart phone. If crisis situation code D is received, the smart phone transmits personal information, a character message informing that the user is captured underground due to ground sinking and GPS position information to the 112 and 119 local rescue teams and a guardian previously programmed in the smart phone.

If acceleration and inertia signals are almost undetected in the process block 218 and the audio data S is speechless or a groan in the process block 219, this is a state of falling down and being injured and is determined as crisis situation C. Since the process block 217 of the signal processing flow has already detected a big impulse after the acceleration and inertia signals generated by the falling accident have touched the threshold, this is determined as an injury crisis caused by a falling accident.

In the case of sexual harassment, it is general that an assailant and a victim know each other and the assailant quietly touches the body of the victim without a sudden physical attack, and since acceleration and inertia signals are generated weakly and there is no scream, signal levels of the sound, the acceleration and the inertia are shown below the threshold as is shown at the logical AND signal synthesis point 230 of the signal processing flow shown in FIG. 4. However, a quiet conversation is made, and a keyword such as "You shouldn't do this" or the like is detected through voice recognition. That is, a crisis of sexual harassment (code A) is detected through voice recognition by filtering background noises from a conversation inputted through the microphone 50 installed in the smart band, converting the filtered signal into a digital voice pattern using a digital converter and matching the digital voice pattern to the model of "You shouldn't do this" stored in the audio signal pattern library. The recorder of the smart phone is switched to operate in a sexual harassment recording mode shown in the block diagram of FIG. 5 and records sexual harassment speeches. At the same time, to prevent physical approach, the smart phone transmits a character message saying that "I am sexually harassed" and GPS position information to a guardian previously programmed in the smart phone, and the guardian receiving the character message makes a phone call to the victim. If the phone of the victim rings, the assailant of the sexual harassment stays backward and allows the victim to answer the phone. Since they know each other in most cases, the assailant lets the victim free to answer the phone. If the phone call is not answered, the guardian will continue to call, and the phone will ring continuously. The victim of the sexual harassment escapes from the crisis situation by answering the phone and talking with the guardian.

In addition, in the case of verbal sexual harassment without physical contact, if the wearer touches the manual switch 100 of the smart band three times, the recorder of the smart phone is switched to operate in a sexual harassment recording mode and records sexual harassment speeches.

Figure 7:
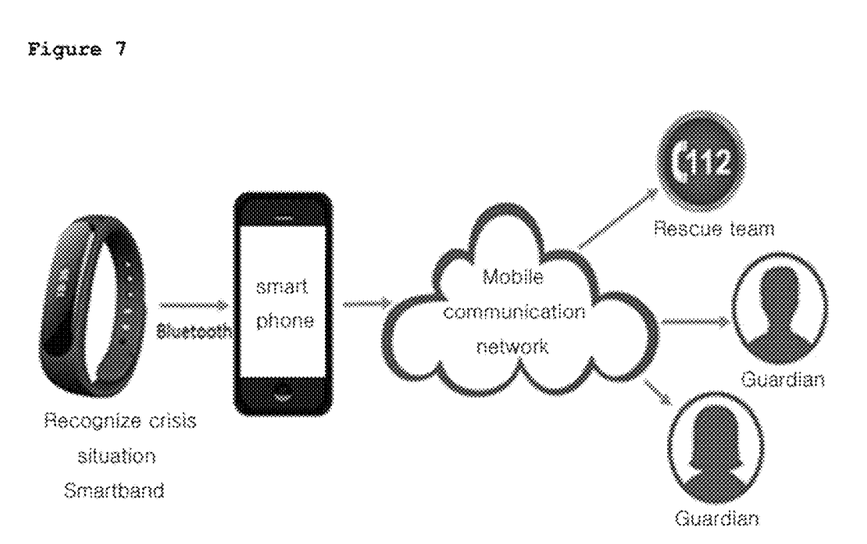
FIG. 7 is a block diagram showing a system interworking with a smart band according to an embodiment of the present invention.

Since the wireless request for rescue in a crisis situation is notified to a local rescue team and relatives through a mobile communication network as shown in FIG. 7 using a mobile communication terminal such as a smart phone, a user should possess a smart phone. The smart band for autonomously recognizing a crisis situation and automatically requesting rescue of the present invention constantly monitors whether the user possesses a smart phone, and if the user does not possess a smart phone, the smart band warns the user to possess a smart phone in a method of vibration or the like. The smart phone monitoring is not passive, but if the distance between the smart band and the smart phone is longer than a predetermined distance, i.e., five meters, the smart band automatically generates an alarm in a method of vibration or the like. This is a full automatic method different from a method of finding a smart phone by pressing a search button of a smart phone finder in the prior art.

The present invention has further improved the functions of a conventional passive personal safety device, in which a user himself or herself should find and press an emergency button, and the device itself determines a crisis situation and automatically requests rescue. Such a function of autonomously recognizing a crisis situation and automatically requesting rescue is absolutely necessary when a person himself or herself loses consciousness and falls down by a gunshot or a falling accident.

The smart band of the present invention monitors within 5 meters whether a smart band wearer possesses a smart phone at all times and warns in a method of vibration or the like if the user does not possess a smart phone so that a situation incapable of sending a request for rescue may not occur when a crisis is encountered since the user does not possess a smart phone. This function reminds the user not to forget to carry a smart phone in daily lives and prevents a tragic accident that may occur as the user is not rescued when a crisis occurs.

The smart band of the present invention may separately recognize a crisis situation of terror, sexual harassment, sexual violence, a falling accident of an old person, and being trapped underground due to ground sinking and request a rescue appropriate to the crisis situation. In addition, a false alarm can be prevented by utilizing the sound, inertia and acceleration sensors in an integrated manner and applying an intelligent crisis situation analysis algorithm.

The present invention is not limited to the disclosed embodiments, and it is apparent to those skilled in the art that the present invention may be diversely changed or modified without departing from the scope and spirit of the present invention. Accordingly, examples of the changes and modifications fall within the claims of the present invention.

I claim:

1. A smart band apparatus for autonomously recognizing a crisis situation and automatically requesting rescue based on sound and motion patterns, the smart band apparatus comprising:
   a microphone that collects sound patterns of a scream or a sudden sound in a crisis situation;
   an audio signal pattern library that stores keyword sound patterns, which are generated in memory in each crisis situation;
   acceleration and inertia sensors installed that sense a movement of a wearer;
   a motion analysis memory that stores a waveform determination algorithm for collecting signals inputted from the acceleration and inertia sensors for a predetermined time period, analyzes a motion signal pattern, and categorizes the motion signal pattern as impulse, pulsation or steady;
   a crisis situation recognition processor that derives a crisis situation code of any one of terror, sexual violence, a falling accident, a natural disaster, and a sexual harassment by analyzing a motion waveform and a sound pattern;
   a microcontroller that automatically transmits a request for rescue to a rescue team or a guardian programmed in advance, together with the derived emergency crisis situation code, a GPS position and personal information of the wearer, said microcontroller cooperative with said microphone, said audio recognition library, said acceleration and inertia sensors, said motion analysis memory and said crisis situation recognition processor;
   a Bluetooth communication interface unit cooperative with microcontroller;
   a smart phone monitoring circuit that monitors a pairing smart phone by said Bluetooth communication interface unit; and
   a switch that records sexual harassment speeches or manually initiating a crisis situation when the wearer is sexually harassed.

2. The smart band apparatus of claim 1, wherein said microphone is a PiezoMEMS or a micro-ceramic microphone that collects screams of the wearer or surrounding sounds, wherein said microphone converts the scream or surrounding sound into a digital pulse pattern through sound processing and inputs the digital pulse pattern into said crisis situation recognition processor so that the digital pulse pattern may be compared with each reference voice sound pattern stored in memory, wherein a signal from some crisis situation recognition processor corresponding to the crisis situation is transmitted said the microcontroller, together with personal information of the wearer, wherein said microcontroller inputs the data into a Bluetooth communication modulator and the data is transmitted to a smart phone of the wearer through said Bluetooth interface unit.

3. The smart band apparatus of claim 2, further comprising:
   a digital audio signal pattern library having reference voice and sound patterns, wherein said digital audio signal pattern library is cooperative with said microcontroller.

4. The smart band apparatus of claim 1, wherein said inertia and acceleration sensors collect motion patterns of the wearer, the acceleration and inertial sensor having a MEMS sensor, wherein signals of the acceleration and inertia sensors are abnormal and cross a threshold level, the signal triggers collection of the motion patterns to collect the motion patterns for twenty seconds thereafter.

5. The smart band apparatus of claim 1, wherein said smart phone monitoring circuit monitors whether the wearer possesses a pairing smart phone or whether the smart phone is within five meters through wireless communication.

6. The smart band apparatus of claim 1, further comprising:
- a voice keyword training function trains and inputs the wearer's keywords into the audio signal pattern library a voice of the wearer and searches for a keyword pattern inputted in the voice of the wearer when a crisis situation is encountered.

\* \* \* \* \*